ered with cotton and sterilized at 121° C. for 20 minutes.
United States Patent Office 3,267,004
Patented August 16, 1966

3,267,004
FERMENTATION METHOD FOR PRODUCING GENTISIC ACID
Leighton A. Nutting, Libertyville, and Lucrecia Borjas, Lake Bluff, Ill., assignors to Abbott Laboratories, North Chicago, Ill., a corporation of Illinois
No Drawing. Filed May 8, 1964, Ser. No. 366,129
5 Claims. (Cl. 195—28)

This invention relates to a method for producing gentisic acid by fermentation and more particularly, it is concerned with a one-step process for the production of gentisic acid by the fermentation of naphthalene with *Pseudomonas desmolytica*.

Gentisic acid which chemically is 2,5-dihydroxy benzoic acid and its pharmaceutically acceptable, acid-addition salts are valuable as analgesics and for the treatment of rheumatic pains in warm-blooded animals. This acid is relatively expensive to produce synthetically. Thus, those skilled in the fermentation art have attempted in recent years to find microorganisms which would convert inexpensive hydrocarbons to gentisic acid directly.

In the Journal of Bacteriology, 73, 46 (1957), there is described the fermentative conversion of naphthalene to salicylic acid by *Pseudomonas aeruginosa*. The following year, Yono and Arima in J. Gen. Appl. Microbiology, 4, 241 (1958) described the formation of gentisic acid from salicylic acid by fermentation in the presence of certain, unidentified Pseudomonas species. However, the production of gentisic acid directly from naphthalene by fermentation has hitherto not been described.

It is the main object of the present invention to provide a method for producing gentisic acid from naphthalene by fermentation. Another object is the provision of a specific organism which will convert naphthalene to gentisic acid directly. Other objects will become apparent from the following specification and appended claims.

This invention is based upon the discovery that when naphthalene is fermented in the presence of *Pseudomonas desmolytica* in submerged form at a controlled temperature with suitable agitation and aeration in an aqueous medium containing inorganic salts plus a small amount of yeast extract, direct conversion to gentisic acid results. The taxonomy of the microorganism employed is adequately described on page 114 of Bergey's Manual of Determinative Bacteriology, 7th edition, 1957, published by The Williams and Wilkins Co. of Baltimore, Maryland. Since there is no readily available source of this particular species, a living culture of *Pseudomonas desmolytica* as used herein has been deposited at the Culture Collection Unit of the Northern Utilization Research and Development Division, U.S. Department of Agriculture, Peoria, Illinois, under the NRRL number B–3108.

The fermentation is carried out in a conventional manner, i.e., an aqueous medium containing inorganic salts such as $K_2HPO_4$, $NH_4Cl$, $MgSO_4$, $MnCl_2$ and $CaCl_2$ plus a small amount of yeast extract is first prepared, the pH adjusted to about 7.5, the naphthalene added and the medium inoculated with *Pseudomonas desmolytica*. The resulting liquid culture is then incubated at a temperature of from 24° to 32° C. for 5 to 7 days with aeration and agitation. The gentisic acid produced during the fermentation is recovered by filtering the beer, reducing to a small volume, acidifying and extracting with an organic solvent such as ethyl ether. If desired, the solvent solution can be evaporated and the gentisic acid residue recrystallized from water. Alternatively, the solvent solution can be passed through a silica-calcium sulfate gel or suitable ion exchange column and eluted with ethyl ether or chloroform, the eluate treated with activated charcoal, the solvent evaporated and the residue crystallized from water. Gentisic acid is a white, crystalline solid melting at 201° C.

In a specific embodiment, an aqueous fermentation medium was prepared containing the following ingredients:

| | G./liter |
|---|---|
| $K_2HPO_4$ | 10.0 |
| $NH_4Cl$ | 4.0 |
| $MgSO_4 \cdot 7H_2O$ | 0.5 |
| $MnCl_2 \cdot 4H_2O$ | 0.2 |
| $CaCl_2 \cdot 2H_2O$ | 0.05 |
| Yeast extract | 0.05 |

Six liters of liquid medium were thus prepared and the pH adjusted to 7.5 with phosphoric acid. The medium was then dispensed into 500 ml. flasks at a volume of 125 ml. of medium per flask. The flasks were plugged with cotton and sterilized at 121° C. for 20 minutes. After cooling, the flasks were inoculated with *Pseudomonas desmolytica* and 5 grams of naphthalene per 100 ml. of medium was added. The flasks were thereafter incubated on a rotary shaker at 28° C. for 7 days. Following incubation, the flask contents were filtered to remove any residual naphthalene and the fermented medium was pooled. The crude gentisic acid solution was condensed by removal of water under reduced pressure to a volume of one liter. A 250 ml. portion of the condensed solution was acidified to a pH of 2 with concentrated sulfuric acid and then continuously extracted for 24 hours with 300 ml. of ethyl ether. After treatment of the ether solution with activated charcoal, the volume was reduced to 20 ml. by evaporation and the solution streaked onto silica gel G thin layer chromatography plates which were developed in a solvent system composed of two parts chloroform and one part glacial acetic acid for 40 minutes at room temperature. The plates were dried for 20 minutes and the silica gel containing the gentisic acid (located by fluorescence under ultraviolet light) was removed by scraping. The silica gel was finally extracted with ether, the ether evaporated and the gentisic acid crystallized from water. It melted at 201° C. and gave no depression in melting point when admixed with an authentic sample of gentisic acid.

What is claimed is:
1. A method of producing gentisic acid which comprises fermenting naphthalene in the presence of the organism *Pseudomonas desmolytica* under submerged aerobic conditions in an aqueous culture medium containing inorganic salts and yeast extract and recovering the gentisic acid thus formed.
2. A method as claimed in claim 1 in which the organism employed is *Pseudomonas desmolytica* NRRL number B–3108.
3. A method as claimed in claim 1 in which the culture medium is maintained at a temperature of from 24° to 32° C. for a period of from 5 to 7 days.
4. A method as claimed in claim 1 which includes the steps of filtering the culture medium, acidifying and extracting the crude gentisic acid with an organic solvent.
5. A method as claimed in claim 4 in which the organic solvent employed is ethyl ether.

No references cited.

A. LOUIS MONACELL, *Primary Examiner.*
L. M. SHAPIRO, *Assistant Examiner.*